United States Patent [19]

Orlanski

[11] 4,108,468
[45] Aug. 22, 1978

[54] SLEEPER ADAPTER FOR A COLLAPSIBLE BABY STROLLER

[76] Inventor: Isidoro Orlanski, 116 Magnolia La., Princeton, N.J. 08540

[21] Appl. No.: 755,754

[22] Filed: Dec. 30, 1976

[51] Int. Cl.² .......................................... B62B 11/00
[52] U.S. Cl. .................................. 280/648; 280/649; 280/650
[58] Field of Search ................ 280/47.4, 47.39, 47.38, 280/641, 643, 658, 42, 647, 648–650, 47.35, 644, 657; 296/1 B; 297/130, 255, 284

[56] References Cited

U.S. PATENT DOCUMENTS

| | | | |
|---|---|---|---|
| 1,576,075 | 3/1926 | Tisdell | 280/643 |
| 1,765,786 | 6/1930 | Brown | 280/643 |
| 3,550,998 | 12/1970 | Boudreau et al. | 280/47.38 X |
| 3,953,046 | 4/1976 | Johansson | 280/644 |
| 3,967,833 | 7/1976 | Fleischer | 280/42 X |
| 3,995,882 | 12/1976 | Watkins | 280/42 X |

*Primary Examiner*—Joseph F. Peters, Jr.
*Assistant Examiner*—Norman L. Stack, Jr.
*Attorney, Agent, or Firm*—Richard C. Woodbridge

[57] ABSTRACT

An adapter apparatus is employed to convert a standard collapsible baby stroller into a portable sleeper stroller. The adapter includes a pair of extension members which are received by two diagonal tubular elements on the collapsible frame of the stroller. A piece of fabric is suspended between the two extension members in such a fashion as to form a sling having a relatively horizontal base. A pillow is placed in the seat of the stroller so as to continue the horizontal plane established by the sling. The sling and pillow are then covered with a section of mattress material upon which a child may recline. The adapter also includes a T-shaped stop guard means at the end of the sling to prevent a child from slipping out of the end of the adapter and a pair of sidewall means to prevent a child from inadvertently rolling over the side of the stroller. A conventional baby stroller may be easily converted into a sleeper stroller by means of the invention. The device may also be collapsed with the frame of the stroller, or it may be separately removed and formed into a small package for easy storage.

20 Claims, 9 Drawing Figures

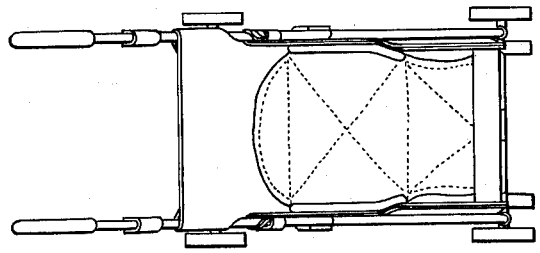
FIG.7
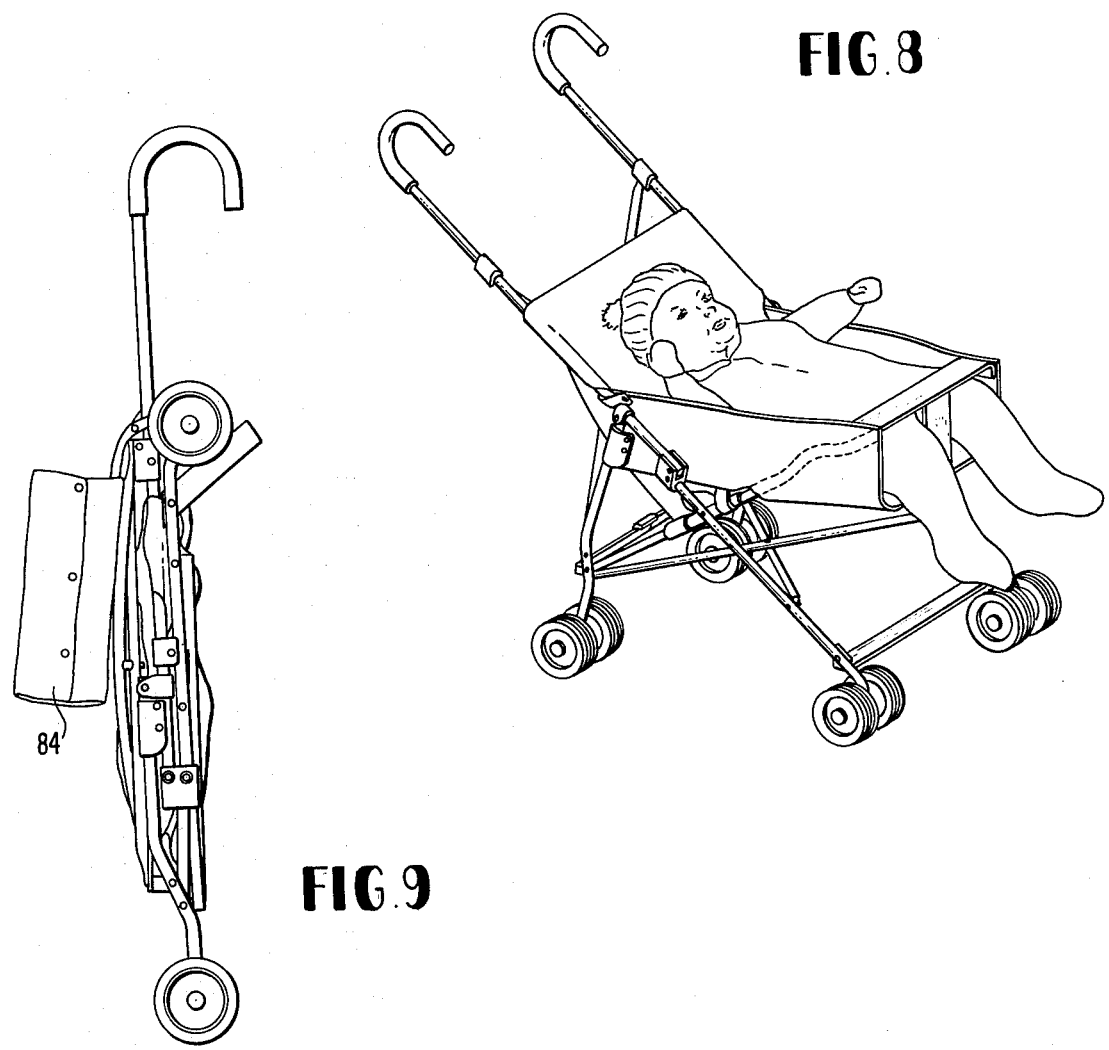
FIG.8
FIG.9

SLEEPER ADAPTER FOR A COLLAPSIBLE BABY STROLLER

BACKGROUND OF THE INVENTION

1. Field of the Invention

This invention relates to an adapter for converting a collapsible baby stroller into a sleeper stroller.

2. Description of the Prior Art

There are many different types of strollers known to those of ordinary skill in the art. Most strollers are adapted for transporting a child in either the sitting position or the sleeping position, but rarely will a stroller convert from one position to another.

One type of convertible stroller of interest is disclosed in U.S. Pat. No. 1,576,075 to T. A. Tisdell and entitled "Combined Gocart, High Chair, and Baby Carriage". The Tisdell patent discloses a three-wheeled folding apparatus including a pair of horizontal telescoping extensions which are adapted to receive a flexible cloth "container" thereby extending the effective horizontal plane of the baby seat. Accordingly, the stroller can be converted from a sit-up type to a reclining type of baby carriage. Unfortunately, the Tisdell type of apparatus is moderately complicated and does not appear to be adapted for modern collapsible baby strollers. The Tisdell invention is, however, noteworthy in that it illustrates that collapsible baby strollers have been known for some period of time.

"Convertible and Foldable Baby Vehicles" are disclosed in U.S. Pat. No. 2,872,203 to C. W. Hedstrom. The Hedstrom apparatus is designed to convert from a sit-down type of baby stroller into a reclining type of baby carriage. However, the approach disclosed in the Hedstrom patent is a relatively complicated one and appears to necessitate a pecial type of baby carriage in order to accomplish full convertibility.

Varner, U.S. Pat. No. 2,625,407 discloses another "Foldable Wheeled Vehicle for Infants" which is of interest for the type of structure that is described therein. In particular, it provides for a baby stroller in which the front section may be removed so that it can be converted into a baby type of automobile safety seat.

German Pat. No. 1,199,629 is also of interest in that it discloses a moderately uncomplicated modern collapsible baby stroller.

Rollie, et al, U.S. Pat. No. 2,632,653 discloses a convertible shopping and travel cart having a structure similar to that of a modern collapsible umbrella-type baby stroller.

One of the major problems associated with prior art convertible strollers is that the strollers must be of a specific unique design so that convertibility can be achieved. This, of course, increases the cost of manufacturing the stroller and limits the market in which the convertible parts can be sold. Accordingly, an apparatus was clearly needed which would be adaptable to virtually all of the different types of collapsible baby carriages. In addition, the convertible apparatus had to be relatively simple and inexpensive so that the baby stroller could be converted with a minimum of difficulty. It was in the context of these needs that the present invention arose.

SUMMARY OF THE INVENTION

Briefly described the invention comprises an adapter for converting a collapsible baby stroller into a portable baby sleeper. A typical modern collapsible stroller includes at least two parallel tubular arms which support the fabric of the baby seat. The structure of the tubular arms is such that they are typically at a diagonal angle, often about 35° to 40° with respect to the plane of the wheels of the unfolded stroller. The seat supporting tubular members are generally capped with a plastic button to prevent the rough edges of the tubular member from tearing or cutting adjacent materials. The present invention comprehends removing the plastic caps and inserting a pair of extenders such that the effective length of the tubular frame members is increased by about 10 inches. A sling piece of material is suspended between the extension members in such a way as to extend the horizontal plane of the stroller. A pillow may be placed in the seat of the stroller so as to make the seat of the stroller flush with the plane of the sling. Then a mattress is used to cover the sling and the pillow so that the child has a flat surface upon which to recline. The construction of the apparatus is such that a big child's leg will dangle over the end of the sling. A T-shaped stop guard is constructed across the end of the sling and adapted to fit between the legs of the child so that the child does not inadvertently slip out of the converted stroller. Another piece of material extends horizontally from the extension members to a part of the collapsible frame of the stroller and forms safety sidewalls therewith to prevent the child from accidentally rolling out of the stroller sideways. The apparatus can be rolled up into a small kit which is then wrapped with a suitable cover material.

A conventional collapsible baby carriage can be converted in a matter of minutes from a sitting-type stroller to a reclining-type carriage. It is possible to adapt the structure to most conventional strollers with very little difficulty. Therefore, the adapter is moderately universal and does not require a special stroller to mate with. These and other features of the adapter invention will be more fully understood with reference to the following drawings and detailed description of the invention.

BRIEF DESCRIPTION OF THE DRAWINGS

FIG. 7 is a top plan view of a converted stroller.

FIG. 8 is a perspective view of a converted stroller as employed to transport a child in the reclining position.

FIG. 9 is a side elevational view of a collapsed converted stroller illustrating the manner in which the adapter parts fold into the frame of the stroller apparatus.

DETAILED DESCRIPTION OF THE INVENTION

During the course of this description like numbers will be used to indicate like elements according to the different views of the invention.

Figure 1:
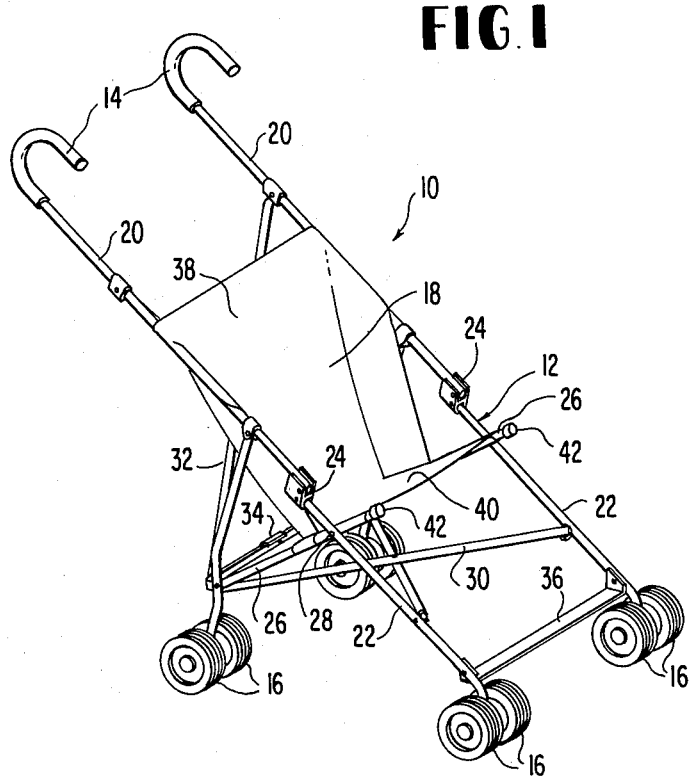
FIG. 1 is a perspective view of a conventional collapsible baby stroller.

FIG. 1 is a perspective view of a conventional umbrella-type stroller 10. A typical example of this type of stroller is manufactured by Cross River Products of St. Catherines, Ontario, Canada and Rochester, N.Y. under the mark "UMBROLLER". Basically such a stroller includes a collapsible frame 12, a pair of handles 14, a plurality of wheels 16 and a fabric type of hammock seat 18. The frame 12 includes a pair of folding diagonal members 20 and 22 hinged at a point 24. Handles 14 are located at the top of members 20 and the front wheels 16 are located at the lower end of members 22. A pair of parallel diagonal members 26 cross members 22 are adapted to rotate about pivot point 28 with respect to members 22. The frame 12 includes a bottom cross brace 30 and a back cross brace 32 for stability. The whole apparatus can be locked in the unfolded position by forcing overcenter lock 34 into the locking position. A flexible plastic strap 36 is used to prevent the front wheels 16 from spreading too widely. The seat 18 is attached at the top thereof to tubular members 20 and at the bottom thereof to tubular members 26. The seat 18 includes a back rest portion 38 and a sitting portion 40. Tubular elements 26 are capped by a safety plastic element 42 to prevent the rough edges of the tubular material from cutting or tearing items with which the stroller may come into contact. Generally the tubular material comprises an aluminum extrusion. Clearly, other materials, preferably lightweight materials, can be employed also. Usually a pair of wheels 16 is found at each end of cross elements 26 and 22. Accordingly, a typical baby stroller has a total of eight wheels. The seat material 18 can be a lightweight nylon or a heavy duty canvas or the like. The handles 14 are frequently coated or provided with grips so as to facilitate the manipulation of the stroller.

Figure 2:
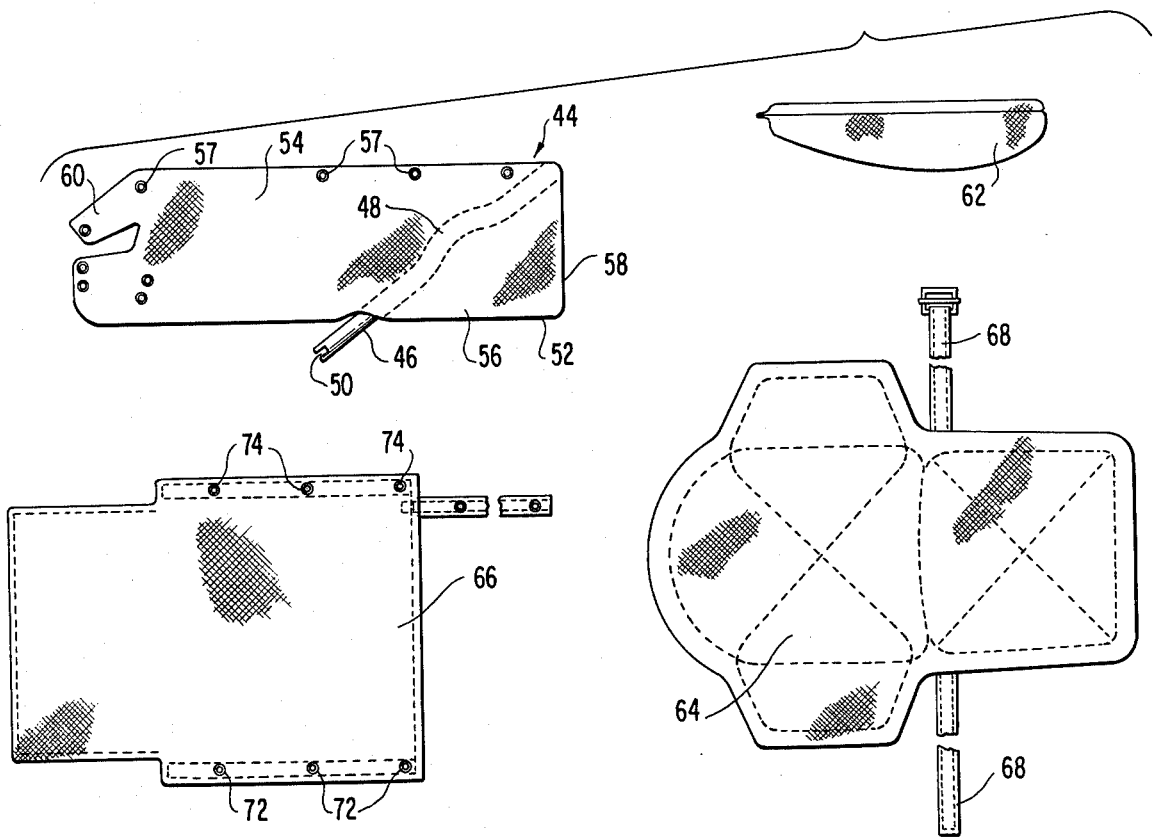
FIG. 2 illustrates the elements of the adapter apparatus.

The elements of the adapter kit are illustrated in FIG. 2. The basic adapter unit 44 includes extender members 46 which are adapted to be received inside of tubular members 26 of the stroller frame 12. Each extender member 46 has an indentation or bump 48 therein which was added so as to avoid interference between the collapsed frame 12 and the extender member 46. The end of extender member 46 includes a slot 50 which is provided to straddle pivot pin 28 inside of tubular member 26. The adapter unit 44 also includes a sling portion 52 and sidewall portions 54. Sling portion 52 has a triangular cross section including a flat level portion 56 and a T-shaped end safety guard portion 58 which serves to prevent the child from falling out of the stroller unit. Sidewall section 54 includes a plurality of snaps 57 which may be used to connect to a cover over the top of the child. The end 60 of the sidewall section 54 furtherest removed from the extender 46 is structured in such a fashion as to fasten to frame member 20. The adapter kit elements shown in FIG. 2 also include a pillow 62, a mattress 64, and a wrapper 66. The pillow 62 may be of almost any shape, as long as it ultimately conforms to the shape of the bottom portion 40 of seat 18. Since the bottom portion 40 is approximately triangular in cross section, the preferred embodiment of the pillow 62 is therefore one which has a triangular lower section and a relatively flat upper section. When the pillow 62 is placed into the bottom 40 of seat 18 the top surface of the pillow is roughly parallel with the bottom surface 56 of the sling 52.

The mattress section 64 has a shape that approximates that of a Christian cross. The arms of the cross are provided so as to cover the gap that normally exists between the seat 18 and the sidewall section 54. Mattress 64 typically might include about ½ inch or so of matting material quilted into a canvas-like cover sheet. A pair of ties 68 can be used to secure the mattress 64 in place above the pillow 62 and the adapter unit 44. The purpose of the mattress is to level out the upper surface of the pillow 62 and the lower surface 63 of the sling section 52.

Figure 3:
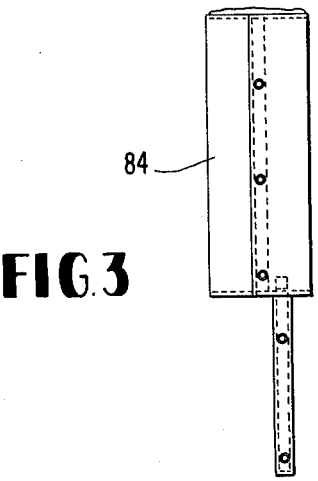
FIG. 3 illustrates the manner in which the pillow can be rolled into a small package and stored.

The wrapper 66 may take on any one of a variety of shapes. A small wrapper may be simply used to enclose the pillow 62 so that it may be stored separately when the stroller is folded as shown in FIG. 9. Or the wrapper 66 may be expanded in size so that it can wrap up the entire kit and store it conveniently. The wrapper 66 includes a plurality of snap fasteners, some of which are male snap fasteners 72 and some of which are female snap fasteners 74. However, under certain circumstances, other fasteners such as zippers may be employed as well. FIG. 3 illustrates the way in which the snap fasteners 72 and 74 mate to each other.

Figure 4:
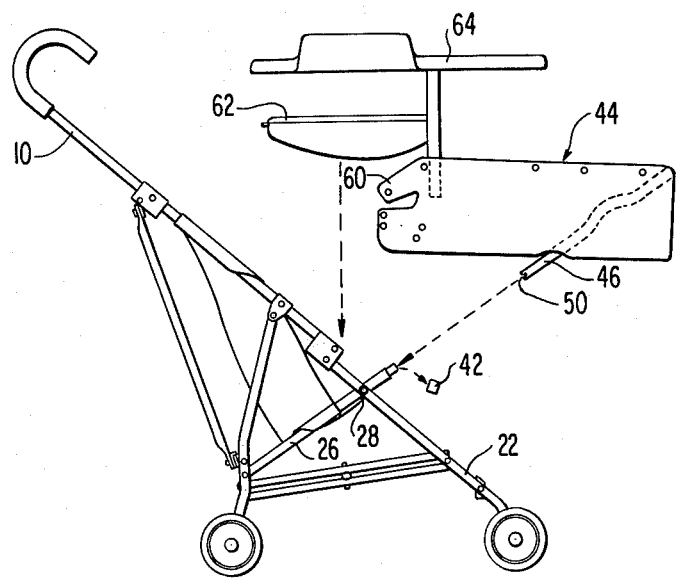
FIG. 4 illustrates in an exploded side view the manner in which the adapter elements are incorporated into the stroller structure so as to convert the stroller into a recliner-type baby carriage.

The manner in which a conventional baby stroller 10 is converted into a recliner type carriage 76 is illustrated in FIG. 4. The conventional carriage 10 does not need any special modification other than the removal of protection cap 42 from the end of tubular member 26. The adapter unit 44 is first attached to the stroller 10 by inserting the forked end 50 of the extender member 46 into the now opened end of tubular member 26. The forked end 50 is adapted to straddle the pivot pin 28 connecting the crossed tubular members 26 and 22 as previously described. This procedure is followed on both sides so that the extension members 46 suspend the sling unit 52 between them. The end 60 of the sidewall unit 54 is then snap fastened onto upper tubular member 20 so as to form a barrier between the extension rods 46 and the tubular member 20. In the next step the pillow 62 is inserted into the bottom portion 40 of the seat 18 in such a fashion that the upper surface of the pillow 62 is roughly level with the bottom portion 56 of the sling 52. The bottom portion 56 of the sling 52 serves to effectively extend the horizontal plane established by the top of the pillow 62. As previously described, it is not absolutely necessary that the pillow 62 have a triangular shape, rather it is desirable that the pillow material used be such that it can conform to the shape of the bottom portion 40 of the seat 18 so that it can create a horizontal flat surface. In the last step, the mattress 64 is laid in place on top of the pillow 62 and the adapter unit 44 thereby establishing a regular, smooth and comfortable sleeping surface. Lastly, the ties 68 of the mattress 64 are secured to the frame of the stroller 10 to prevent the mattress 64 from slipping.

Figure 5:
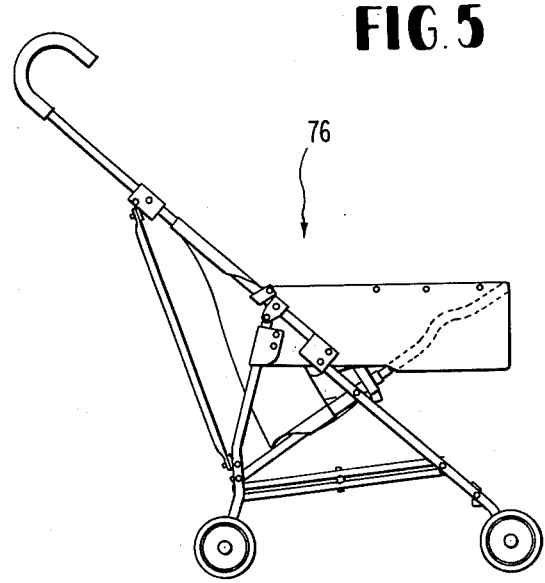
FIG. 5 is a side elevational view of a converted stroller.
Figure 6:
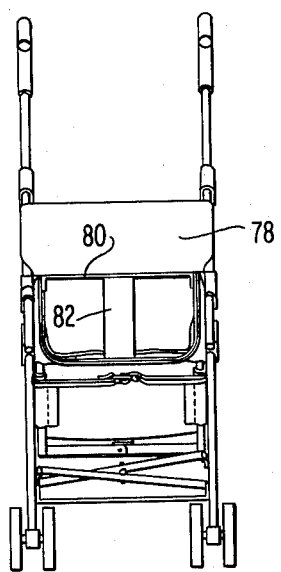
FIG. 6 is a front elevational view of a converted stroller.

A completely converted stroller 76 is illustrated in various different conventional views in FIGS. 5, 6 and 7. Another feature of the present invention can be understood in detail with reference to FIG. 6. The end of the adapter unit 44 includes a T-shaped stop guard section 78 including a horizontal portion 80 and a vertical portion 82 which joins the horizontal portion 80 near the center thereof. The other end of vertical portion 82 is connected to the bottom section 56 of the sling 52. The vertical portion 82 is adapted to fit between the legs of a reclining infant in such a manner as to prevent him from slipping out of the converted stroller 76. According to the preferred embodiment the fabric employed in making the adapter unit is uniform. A canvas or heavy gauge cotton material is quite suitable. Accordingly, the same material can be used for the sling 52, the sidewall section 54, the cover of the pillow 62, the cover of mattress 64, mattress ties 68, cover 66, horizontal piece 80 and vertical piece 82. Other materials such as nylon, for example, could be used just as easily. It is however, important that the fabrics be strong and washable.

As illustrated in FIG. 8 the legs of a big child will probably dangle over the edge of the sling 52. Of course, if the child is really small or if the adapter unit were quite large, this would not necessarily be so. In the preferred embodiment this arrangement has been found to be quite comfortable for a child and it is not difficult for a child to sleep in this position.

A collapsed convertible stroller is illustrated in FIG. 9. The stroller may be collapsed with the adapter unit 44 and the mattress 64 in place. However, since the pillow 62 is moderately bulky, it is frequently desirable to wrap it up in wrapper 66 and attach it to the exterior frame of the collapsed stroller. The pillow package 84 is illustrated in FIG. 3 and shown in position in FIG. 9.

While the invention has been described with reference to a preferred embodiment thereof, it will be understood by those of ordinary skill in the art that various different changes and modifications can be made to the parts of the invention without departing from the spirit and scope thereof. For example, a wide variety of fabric materials could be employed in the manufacture of the adapter elements illustrated in FIG. 2. The snap fasteners 57, 72 and 74 are conventional and well known to those of ordinary skill in the art. The unconverted stroller 10 is in itself entirely conventional. The only non-fabric part requiring special machining is the extension member 64 which preferably comprises a solid aluminum rod which may be machined by conventional methods to the shape described in the drawings. The extension rod 46 is also illustrated as having a bend 48 therein so as to facilitate its folding into the collapsed position as illustrated in FIG. 9. However, it is possible that in some collapsible strollers the bend 48 may not be necessary while in others the bend 48 may take on a distinctly different shape. The dimensions of the adapter are further not believed to be critical. The distance between the tubular members 26 and therefore the distance between the extension members 46 is approximately 10 inches on a standard stroller. This dimension can be as much as 12 inches in other models in which case an adapter having similar structure but different dimensions would have to be employed. Nevertheless, the adapter described in this application is believed to be substantially universal for most collapsible strollers and can be easily manufactured from conventional materials.

I claim:

1. A collapsible baby stroller apparatus comprising:
   a collapsible frame means including a pair of oppositely disposed parallel elongated seat supporting members;
   wheel means connected to said collapsible frame, said wheel means comprising a plurality of wheels all lying in a common plane when said stroller apparatus is in the uncollapsed state, said elongated members having a diagonal relationship with respect to the plane of said wheels in said uncollapsed state;
   seat means attached to said collapsible frame;
   extension means connected to said parallel elongated members for extending the effective length of said elongated members;
   a sling means suspended across said extension means, said sling means including support material which is continuous with the material of said seat means, said sling means creating a first substantially horizontal support plane; and,
   a levelling means receivable in said seat means for creating a second horizontal support plane which is substantially coplanar with the first horizontal support plane of said sling means.

2. A collapsible baby stroller apparatus comprising:
   a collapsible frame including a pair of oppositely disposed parallel elongated seat supporting members;
   wheel means connected to said collapsible frame, said wheel means comprising a plurality of wheels all lying in a common plane when said stroller apparatus is in the uncollapsed state, said parallel elongated members having a diagonal relationship with respect to the plane of said wheels when said stroller and apparatus is in said uncollapsed state;
   seat means attached to said collapsible frame;
   extension means connected to said parallel elongated members for extending the effective length of said elongated members;
   a sling means suspended across said extension means; and,
   a levelling means receivable in said seat means for levelling the effective horizontal support plane of said seat means, the effective horizontal support plane of said seat means being substantially in the same plane as the horizontal support plane of said sling means.

3. The apparatus of claim 2 wherein said leveling means is a pillow means.

4. The apparatus of claim 3 wherein said sling means includes a pair of sidewall means, each adapted to extend from said extension means and adapted to attach to a point on said collapsible frame.

5. The apparatus of claim 4 wherein said extension means includes a bend so that the apparatus may be folded to the collapsed position without significant interference between said extension means and said collapsible frame.

6. The apparatus of claim 5 further including a safety stop means for preventing a child from sliding out of the sling means, said safety stop means comprising:
   a first piece of material extending across the extension means; and,
   a second piece of material extending between said first piece of material and said sling means and adapted to be situated between the legs of a child using the stroller.

7. The apparatus of claim 6 further including:
   a mattress material adapted to cover said sling means and said leveling means.

8. The apparatus of claim 7 wherein the sling means, sidewall means, leveling means, and mattress means are all made of fabric materials.

9. The apparatus of claim 2 wherein said sling means is continuous with said seat means.

10. An adapter for converting a collapsible stroller to a sleeper stroller, said stroller including a collapsible frame, a seat means suspended across said frame, a plurality of wheels and at least two parallel elongated members which at least partially support said seat means and which have a diagonal relationship to the plane of the wheels of said stroller when said stroller is in the uncollapsed condition, said adapter comprising:
   a pair of extension means for extending the effective length of said elongated members;

a sling means connected to said extension means for providing a first horizontal support surface; and, a levelling means receivable in said seat means for levelling the effective horizontal support plane of said seat means to thereby produce a second horizontal support plane which is substantially coplanar with the first horizontal support plane of said sling means.

11. The apparatus of claim 10 wherein said sling means includes a pair of sidewall means each adapted to extend from said extension means and to be attachable to said collapsible frame.

12. The apparatus of claim 11 further including a mattress means adapted to cover said sling means and said leveling means.

13. The apparatus of claim 12 further including a stop means at the end of said sling means adapted to prevent a child from slipping out of said sling means.

14. The apparatus of claim 13 further including a bend in said extension means so that said stroller may be folded to the collapsed position without significant interference between said extension means and said frame.

15. An adapter apparatus for converting a collapsible stroller to a sleeper stroller, said stroller including a collapsible frame, a seat means suspended across said frame, a plurality of wheels and at least two parallel elongated members which at least partially support said seat means and which have a diagonal relationship to the plane of the wheels of said stroller when said stroller is in the uncollapsed condition, said apparatus comprising:

at least two rigid extension means for extending the effective length of said elongated members;

a sling means adapted to be suspended across said suspension means; and, a pillow means for cooperating with said sling means to provide a substantially horizontal surface substantially coplanar with a portion of the surface of said sling means.

16. The apparatus of claim 15 further comprising:

a pair of sidewall means attached to said extension means.

17. The apparatus of claim 16 further including a barrier extending between said extension means and attached thereto.

18. The apparatus of claim 17 further including a mattress means adapted to cover said sling means and said pillowlike means.

19. The apparatus of claim 18 further including a wrapper means for wrapping said adapter apparatus up into a convenient size package.

20. The apparatus of claim 19 wherein said extension means includes a small bend therein.

* * * * *